US 8,538,694 B2

(12) United States Patent
Conway

(10) Patent No.: US 8,538,694 B2
(45) Date of Patent: Sep. 17, 2013

(54) REAL-TIME ROUTE AND RECHARGE PLANNING

(75) Inventor: Adrian E. Conway, Weston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 299 days.

(21) Appl. No.: 12/784,693

(22) Filed: May 21, 2010

(65) Prior Publication Data

US 2011/0288765 A1    Nov. 24, 2011

(51) Int. Cl.
*G01C 21/34* (2006.01)

(52) U.S. Cl.
USPC ........... 701/533; 701/123; 701/423; 701/411; 701/415; 701/416; 701/440; 701/467; 340/995.19

(58) Field of Classification Search
USPC ............ 701/533, 123, 423, 439, 1, 410, 411, 701/412, 413, 414, 415, 416, 424, 409, 408, 701/400, 440, 467, 468, 431, 22; 320/109, 320/138; 180/65.1, 65.21; 340/995.19
See application file for complete search history.

(56) References Cited

U.S. PATENT DOCUMENTS

| 5,283,513 | A   | * | 2/1994  | Fujita et al. ................... 320/138 |
|-----------|-----|---|---------|------------------------------------------|
| 5,487,002 | A   | * | 1/1996  | Diller et al. ....................... 701/1 |
| 6,864,807 | B2  | * | 3/2005  | Todoriki et al. ............... 340/988  |
| 7,606,641 | B2  | * | 10/2009 | Allen ............................... 701/3 |
| 7,849,944 | B2  | * | 12/2010 | DeVault ..................... 180/65.29  |
| 8,108,138 | B2  | * | 1/2012  | Bruce et al. ................... 701/532 |
| 2006/0058955 | A1 | * | 3/2006 | Mehren ......................... 701/209 |
| 2010/0049397 | A1 | * | 2/2010 | Liu et al. ........................ 701/33 |
| 2010/0106401 | A1 | * | 4/2010 | Naito et al. .................... 701/201 |

\* cited by examiner

*Primary Examiner* — Keith Frisby

(57) ABSTRACT

A system may include a processing device and a routing application included on the processing device. The routing application may be configured to receive a destination location for a vehicle; determine a fuel efficiency of the vehicle; and determine a route for the vehicle from a current location to the destination location, the route being based on the fuel efficiency of the vehicle, a fuel capacity of the vehicle, an amount of fuel remaining for the vehicle, and navigation information including the location of at least one charging station.

28 Claims, 6 Drawing Sheets

REAL-TIME ROUTE AND RECHARGE PLANNING

BACKGROUND

Little attention is usually given to making driving plans for fossil-fuel vehicles, such as gasoline powered automobiles, because fossil-fuel refueling stations are pervasive and maximum fossil-fuel vehicle ranges are large. Even for less fuel-efficient fossil-fuel vehicles, vehicle ranges are on the order of 300 miles. However, for vehicles with more limited ranges, such as pure electric passenger vehicles, the limited range presents difficulties in the planning of longer trips or trips into more remote areas. While electric charging stations may one day become as pervasive in metropolitan areas or along major roadways as fossil-fuel refueling stations are today, vehicle ranges for electric vehicles are likely to remain relatively small compared to those of fossil-fuel vehicles. Accordingly, determining driving plans for vehicles of limited range, taking into account intermediate stops and refueling station locations, can be a complex and time consuming task.

DETAILED DESCRIPTION

Figure 1:
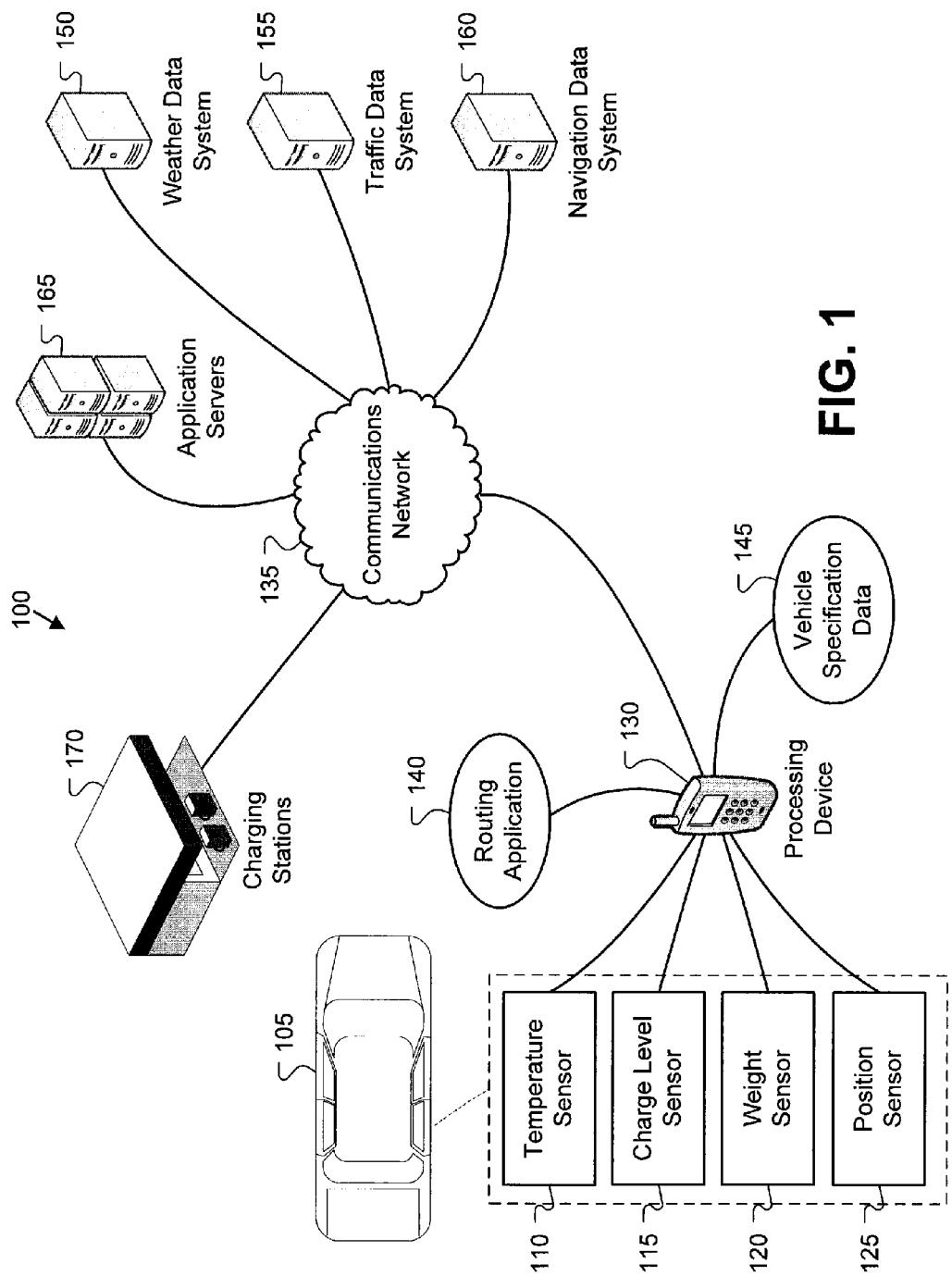
FIG. 1 illustrates an exemplary system for determining a route including a recharge plan.

New vehicles types, such as those based on fuel-cells, batteries, or super-capacitors, are presently being developed to replace or complement more traditional fossil-fuel based vehicles. Rather than dispensing a fuel such as gasoline, diesel, or ethanol into the vehicle, refueling of one of these new types of vehicles may include one or more of charging electric batteries at a charging station, replacing spent batteries with fresh batteries at a replacement station, and refueling fuel cells at a fuel station.

Some of these new types of vehicle may have a more limited range compared to fossil-fuel or hybrid vehicle types. While a vehicle recharging and battery replacement infrastructure is now starting to be developed by new ventures, it is not pervasive as compared to modern fossil-fueling stations. Accordingly, if the driver of a short-range vehicle plans a trip beyond that of the range of the vehicle (e.g., beyond a 40-mile charge capacity), a trip may need to be planned to include an intermediate refueling stop. Hence, a moderate or long-range trip for an electric vehicle may require a determination of a route including charging in order to get from a given origin location to the destination location.

The determination of a route that includes charging (as in the case of an electric vehicle) may be performed by a system including a processing device in the vehicle or by a processing device outside the vehicle in selective communication with a device in the vehicle. The system may receive various inputs, including: vehicle charge level, origin location, destination location, user preferences, and external factors. Based on these and other inputs, the system may find a route in terms of sub-paths between destinations and available charging stations, where each sub-path length does not exceed the vehicle range taking into account one or more of safety factors determined by the system to ensure adequate fuel is held in reserve to account for system unknowns, comfort factors determined by a user to ensure an adequate user-defined amount of fuel is held in reserve for user comfort, types of roads, and other factors that may contribute to vehicle efficiency and routing. Shorter trips may only involve one sub-path, while longer trips may involve multiple sub-paths. The determined route and charging plan may then be displayed on a screen of a processing device, or may be exported to a global positioning system (GPS) device or other navigation system for display.

Additional factors may be used to affect the route and need for charging. For example, the resultant path may further be optimized according to various heuristics, such as a shortest path heuristic, a fastest route heuristic, a most fuel-efficient route heuristic, a least expensive fuel heuristic, a partial fuel fill ups heuristic, or a combination of heuristics. As another example, the system may further take into account factors that affect the potential range of the vehicle, such as: real-time traffic conditions, weather conditions, terrain conditions, vehicle condition, vehicle weight, safety factors, or driver 'comfort' factors.

As yet a further example, the system may account for the schedule and hours of operation of charging stations determine whether a charging station is open and available to receive the vehicle at the planned time. Some charging stations may be closed during the night, and some may be inoperative due to natural (or man made) events or disasters such as ice storms or floods. Additionally, charging stations may be associated with a queue of vehicles to refuel, and accordingly may be determined to have an estimated wait time for a vehicle arriving at a particular time. Further, in some instances a driver may prefer to shop at preferred brand of charging station (e.g., ABC Electric Company vs. XYZ Electric Company), or may prefer to shop at the least expensive station.

The system may further take into account changes that occur during the trip, such as changes in weather, changes to vehicle loading, and changes in destination. Based on these and other changes, the system may dynamically recalculate the route and charging plan.

FIG. 1 illustrates an exemplary system 100 for determining a route including a recharge plan. As shown, the system 100 has one or more vehicles 105, a communications network 135, and one or more charging stations 170. A vehicle 105 may include or be in communication with various sensors, such as a temperature sensor 110, a charge level sensor 115, a weight sensor 120, and a position sensor 125. The vehicle 105 may also include a processing device 130 in communication with the communications network 135 and having a routing application 140 and vehicle specification data 145. The communications network 135 may further be connected to various information systems, including a weather data system 150, a traffic data system 155, and a navigation data system 160. The communications network 135 may also be in communication with application servers 165 and at least one of the charging stations 170. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, system 100 includes one or more vehicles 105. A vehicle 105 may be a transport, conveyance, or other mechanical device that may be used for transport. For example, a vehicle 105 may be used to transport users, passengers and/or freight. Exemplary vehicles 105 may include automobiles, motorcycles, tricycles, locomotives, watercraft such as ships, boats, and submarines, aircraft, and even spacecraft such as rockets and space shuttles.

Vehicles 105 may be pushed, pulled, or otherwise propelled by a source of force, such as various types of engine. An engine is a machine designed to convert various forms of energy into mechanical force and motion. For example, an internal combustion engine is a heat engine that converts thermal energy, derived from internal combustion of fuel, into mechanical energy. As another example, an electric motor is an engine designed to convert electric energy into mechanical energy.

Vehicle 105 engines require a source of energy to operate. Internal combustion engines may use fossil fuels as their source of energy. Electric motors, by contrast, require a source of electrical energy to operate, such as a battery, capacitor, or a solar cell array. Many of these sources of energy are carried aboard the vehicle 105; thus the vehicle 105 may have a limited fuel capacity. Because the amount of energy being carried is limited, the range of the vehicle 105 is based on the fuel capacity and the fuel consumption of the vehicle 105. Fuel consumption may be based on efficiency of the engine in combination with other factors such as weight of the vehicle 105, ambient temperature, weight of additional carried load, road grade, speed of travel, accessory power draw, amount of sunlight, and regenerative braking energy input.

At least a subset of these factors may be determined according to various sensors included in the system 100. Exemplary sensors may include a temperature sensor 110, an energy level sensor 115, a weight sensor 120, and a position sensor 125. Some of these sensors may be included within the vehicle 105 itself.

The temperature sensor 110 may be configured to measure ambient temperature. To accomplish this, the temperature sensor 110 may determine a temperature either of itself in the case of a contact temperature sensor or of a surface nearby to the sensor in the case of a non-contact sensor. For example, a non-contact temperature sensor 110 may determine an amount of infrared or optical radiation received from a specified area on a surface and may infer a temperature of the surface based on the amount of radiation.

The energy level sensor or charge level sensor 115 may be configured to determine the amount of energy remaining for use by the engine. For example, for vehicles 105 that use fossil fuels as an energy source, the fuel may be stored in a fuel tank. Within the tank may be a float connected to one end of a rod, where the other end of the rod is connected to a pivot having a variable resistor. As the level in the field tank drops, the float sinks, the pivot rotates, and the variable resistor changes value. For vehicles 105 that are powered by an electrical energy store such as a battery, the amount of energy remaining in the energy store may be measured by way of a volt meter.

The weight sensor 120 may be configured to determine the weight of the loaded vehicle 105. For example, a vehicle 105 suspension may include multiple springs. These springs may compress and expand according to the load of the vehicle 105. If the spring rate of the springs is given, then the weight of the vehicle 105 load may be computed based on the displacement of the spring from its length with no load, such as being calculated according to Hooke's Law. In other instances, a vehicle 105 may be weighted by an outside device, such as at a highway weigh station.

The position sensor 125 may be configured to determine the location of the vehicle 105. As an example, the vehicle 105 may include a position sensor 125 that operates by reception of precise timing signals sent by global positioning system (GPS) satellites in medium Earth orbit, combined with knowledge of the locations of the GPS satellites and geometric trilateration. As another example, the vehicle 105 may include a position sensor 125 that utilizes network infrastructure of a service provider to identify a current location of a connected device, such as by cell identification and a home location register.

Each vehicle 105 may include or otherwise be associated with a processing device 130. The processing device 130 may include a combination of hardware and software, and may further include one or more software applications or processes for causing one or more computer processors to perform the operations of the processing device 130 described herein. In some instances the processing device 130 may be embedded within the vehicle 105 itself, while in other instances the processing device 130 may be a mobile device carried by an occupant of the vehicle 105. Exemplary mobile processing devices 130 may include laptop and tablet computers, mobile telephones and smart phones, GPS devices, personal digital assistants, e-Book readers, and processing devices included within vehicles 105, among others.

Each processing device 130 may be configured to be in selective communication with one or more networks, including one or more communications networks 135. Communications networks 135 may include one or more interconnected networks (e.g., public switched telephone network (PSTN), voice over internet protocol (VoIP), cellular telephone, general packet radio service, etc.), that provide communications services, including voice calling, packet-switched network services (including, for example, Internet access and/or VoIP communication services), short message service (SMS) messaging, multimedia messaging service (MMS) messaging services, and location services, to at least one processing device 130.

A routing application 140 may be one application included on the processing device 130, wherein the routing application 140 may be implemented at least in part by instructions stored on one or more computer-readable media. The routing application 140 may include instructions to cause the processing device 130 to receive information from the sensors 110-125, determine the rate at which the vehicle 105 uses fuel in its engine, determine a remaining vehicle 105 range, and compute a route for the vehicle 105.

Computer-executable instructions may be compiled or interpreted from computer programs created using a variety of well known programming languages and/or technologies, including, without limitation, and either alone or in combination, Java™, C, C++, Visual Basic, Java Script, Perl, PL/SQL, etc. The routing application 140 may be written according to a number of these and other programming languages and technologies, or a combination thereof.

The processing device 130 may further include or have access to vehicle specification data 145. The vehicle specification data 145 may include data such as the empty weight of the vehicle 105, the fuel capacity of the vehicle 105, provided fuel efficiency data for the model of vehicle 105, and historical actual vehicle 105 efficiency data.

The processing device 130 may be in selective communication over the communications network 135 with one or more data servers hosting additional information that may affect vehicle 105 range or routing. As an example, the processing device 130 may be in selective communication with a weather data system 150, a traffic data system 155 and a navigation data system 160.

The weather data system 150 may be configured to selectively store and retrieve historical actual weather data, present weather conditions, and forecasted future weather conditions. For example, the weather data system 150 may include information relating to present temperature and predicted amount of precipitation.

The traffic data system 155 may be configured to selectively store and retrieve information related to historical, present, and forecasted traffic conditions. For example, the traffic data system 155 may include data relating to road congestion for various roads.

The navigation data system 160 may include information regarding the roads and terrain that may be traversed by a vehicle 105. For example, navigation data system 160 may include grade information, elevation information, road layout, speed limits, road capacities, and indications of road construction or other planned closures and/or delays.

The processing device 130 may be in selective communication over the communications network 135 with one or more application servers 165. In some instances, the application servers 165 may offload some of the processing from the processing device 130. For example, rather than routing application 140 itself determining the remaining vehicle 105 range or computing a path, the routing application 140 may instead query an application server 165 with a message including information such as vehicle 105 weight, vehicle 105 position, charge level, ambient temperature, and destination location. Then, the application servers 165 may perform the processing, and may send a reply to the processing device 130 including the shortest path and/or remaining vehicle 105 range.

A charging station 170 may be configured to allow for the refueling of vehicles 105. In some instances the charging station 170 may accommodate multiple vehicles 105 simultaneously, such as by way of multiple fossil-fuel pumps or electrical receptacles, while in other instances the charging station 170 may only accommodate one vehicle 105 at a time. The charging station 170 may further be configured to determine its level of activity and estimated wait time for refueling of a vehicle 105 based on the length of a queue of vehicles 105 waiting to be charged. The charging station 170 may further be configured to make available information such as whether the charging station 170 is busy or available, the estimated wait time for refueling, and price data and brands relating to refueling at the charging station 170. The charging station 170 may make this information available to the processing device 130 by way of the communications network 135. In some examples, the charging station 170 may transmit the information to the application servers 165 for use by the processing device 130, or the application servers 165 themselves, to reduce the network load on the charging station 170.

In general, computing systems and/or devices, such as processing device 130, weather data system 150, traffic data system 155, navigation data system 160, and application servers 165, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

Computing devices, such as processing device 130, generally include computer-executable instructions, where the instructions may be executable by one or more computing devices such as those listed above. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as weather data system 150, traffic data system 155, and navigation data system 160 described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

While FIG. 1 illustrates an exemplary system 100, other implementations may be used. In some implementations, additional elements may be included or elements shown in FIG. 1 may be omitted or modified. For example, one or more of weather data system 150, traffic data system 155, and navigation data system 160 may be combined in certain implementations. As another example, a system may not include any application servers 165. In still further examples, application servers 165 and one or more of the weather data system 150, traffic data system 155, and navigation data system 160 may be combined, or the processing device 130 may be implemented on multiple or separate devices.

Figure 2:
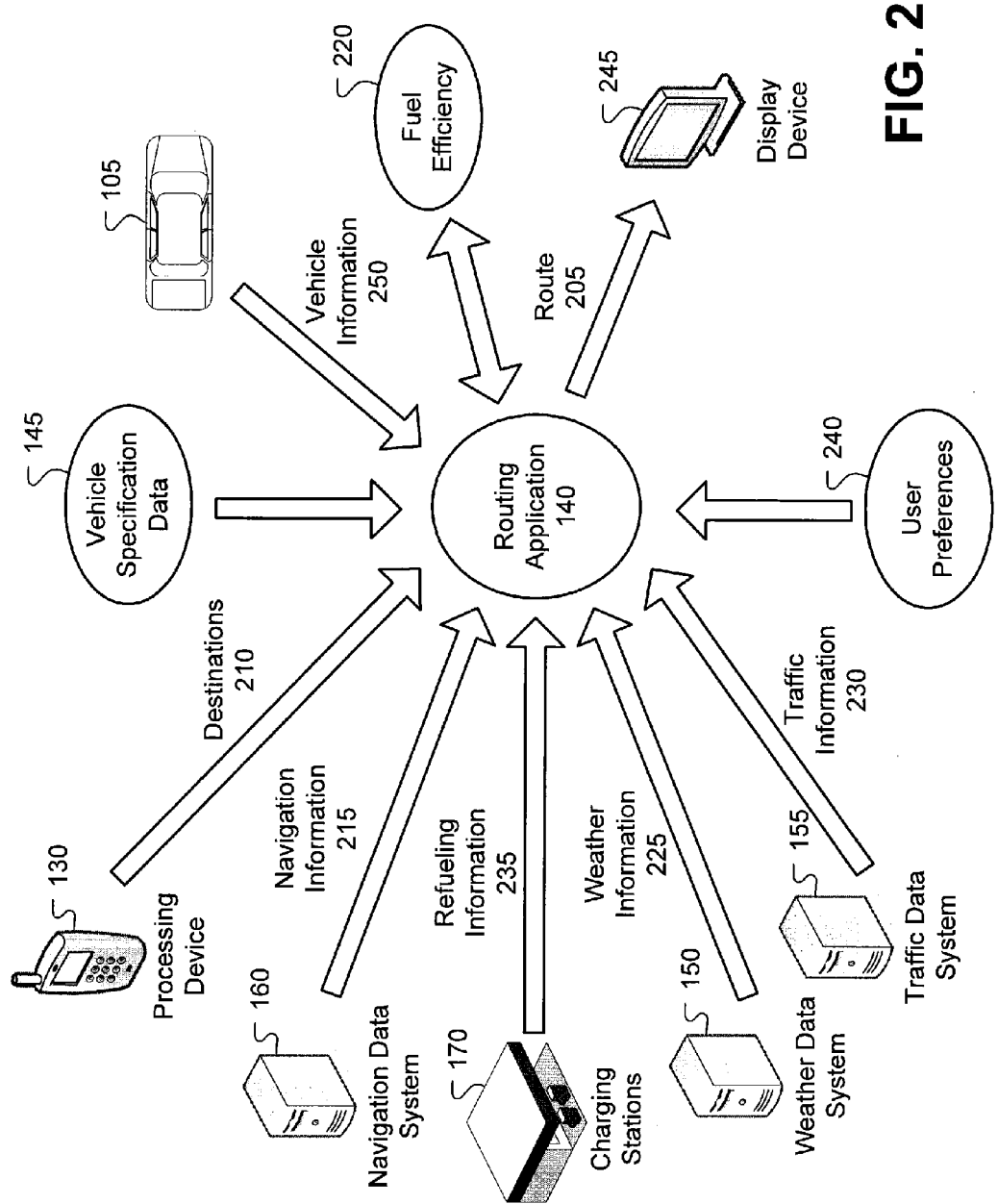
FIG. 2 illustrates an exemplary data flow for the determination of a route for a set of destinations and given navigation information.

FIG. 2 illustrates an exemplary data flow for the determination of a route 205 for a set of destinations 210 and given navigation information 215. The route 205 may be determined based on a determined fuel efficiency 220 for the vehicle 105, as well as on additional factors such as: weather information 225, traffic information 230, refueling information 235, user preferences 240, vehicle specification data 145, and vehicle information 250. The determined route 205 may be displayed to the user on a display device 245.

Using a system such as exemplary system 100, a user may input a set of destinations 210 into the routing application 140 running on processing device 130. The routing application 140 may accordingly receive the set of destinations 210 and determine a route and a charging plan based on navigation information 215. The set of destinations 210 may include one or more locations that the user is trying to reach. The set of destinations 210 may optionally include timing information relating to at least a subset of the destinations to be reached, such as dependency information regarding ordering of destinations 210, as well as a time window, or range of time, at which to arrive at destinations 210. For example, a user may enter a set of ordered points, where one destination 210 is to be arrived at before a second destination 210.

As a more concrete example, a user may wish to head to an automated teller machine (ATM), retrieve cash from the ATM, make it to a haircut appointment by 2:00 PM, and then pick up a child from school between 2:55 PM and 3:05 PM. If the user lacks sufficient funds to pay the barber, then the ATM destination may be required to come before the barbershop in any determined route. This is a specific example of an ordering imposed on the destinations 210. The user may further alter the set of destinations 210, such as to add a stop at a local post office.

The routing information may further receive navigation information 215. Navigation information 215 may be received over the communications network 135 dynamically from the navigation data system 160, and/or from local storage on the processing device 130, such as from a loaded computer disk. The navigation information 215 may include road layout information indicating the connections of the roads to one another. The navigation information 215 may further include information that may be used to aid in determining the cost of a particular segment of roadway, including: speed limit, capacity, grade information, elevation information, and indications of road construction regarding the roads.

Determination of a route 205 may be performed using destinations 210 and the navigation information 215 according to various techniques and heuristics. Road information based on the navigation information 215 may be represented as a graph having a plurality of vertices where the roads intersect. Then, using the graph data, an algorithm such as Dijkstra's algorithm or the A* algorithm may be used to assign cost values to each path or vertex, and then find a path from one destination 210 to another destination 210 on the graph according to the assigned costs. Dijkstras's algorithm is described in detail in Dijkstra, E. W. (1959) "A note on two problems in connexion with graphs." Numerische Mathematik 1, pages 269-271, and the A* algorithm is described in detail in Hart, P. E.; Nilsson, N. J.; Raphael, B. (1968). "A Formal Basis for the Heuristic Determination of Minimum Cost Paths." IEEE Transactions on Systems Science and Cybernetics, pages 100-107. These algorithms may be utilized, for example, to implement a shortest path heuristic determining a shortest route 205.

In Dijkstra's algorithm, a vertex nearest to the origin is set to be the current node, and is assigned a value of zero. All other vertices are assigned a value of infinity. Then, the algorithm determines a cost from the current node to each connected vertex. If a determined cost to reach a vertex is less than a previously recorded cost, then the lower cost to the vertex overwrites the previous cost. Once the analysis of each connected vertex is performed for a given vertex, the given vertex is marked as visited and is not evaluated again. The unvisited vertex with the smallest distance from the initial starting point is set as the next current node, and the process repeats. Once all nodes have been visited, the algorithm starts at the destination, and marks the path backwards to the vertex with the lowest assigned cost. The algorithm continues to mark the path backwards to vertices with the lowest assigned costs until reaching the origin location. This marked path is then output as the shortest path. The A* algorithm is similar to Dijkstra's algorithm, but further accounts for the cost from the starting vertex to each vertex during the analysis, rather than just the cost from the current vertex to the next vertex.

Regardless of the specific algorithms utilized, a route 205 may be computed from a lowest cost path to a destination 210 using the navigation information 215. In the case of a set having multiple destinations 210, multiple such sub-paths may be combined to produce a desired route 205. An exemplary approach for route 205 generation among multiple destinations 210 may include determining, for unordered destinations, each permutation of the set of destinations 210 to use as potential orders of arrival. Then for each permutation, the algorithm may analyze the route 205 to find its shortest path. Then an overall shortest path may be determined based on the set of shortest paths for the various permutations. For sets of destinations 210 including ordered destinations 210, only paths in which the destinations 210 meet the ordering requirements may be considered. Similarly, for sets of destinations 210 including time windows at which the vehicle 105 is to arrive at destinations 210, the algorithm may utilize the time windows to constrain the possible permutations of the set of destinations 210, such as by arrangement of the destinations 210 in time order.

As a further complication, limited fuel capacity of the vehicle 105 also may affect determination of the route 205. While a shortest path to the destinations 210 may be determined, due the limited fuel capacity of the vehicle 105, the vehicle 105 may run out of fuel before reaching the destination 210. Accordingly, because the vehicle 105 has only a limited capacity for fuel, the determined route 205 may require additional stops to refuel the vehicle 105, in addition to stops for the destinations 210.

A route 205 may be determined including the required stops at charging stations 170, taking into account fueling requirements of the vehicle 105. To find such a route 205, the routing application 140 may determine the maximum fuel capacity of the vehicle 105, an initial charge level for the vehicle 105 indicating the amount of fuel remaining, and a fuel efficiency 220 for the vehicle indicating the rate at which the vehicle 105 uses fuel. This information may be determined from the vehicle specification data 145 associated with the vehicle 105, and also from vehicle information 250 received from the sensors 110-125 of the vehicle 105.

For example, the maximum fuel capacity and the fuel efficiency 220 may be determined directly from vehicle specification data 145 regarding the specifications of the vehicle 105. The amount of fuel remaining may be determined based on charge level sensor 115 data received as vehicle information 250. The fuel efficiency 220 may also be determined according to average actual vehicle 105 efficiency obtained from historical vehicle statistics included in the received vehicle information 250. Additionally, the fuel efficiency 220 may be modified according to additional factors, such as weather information 225, and estimated speed of travel, among others. For example, colder weather may reduce the overall fuel efficiency 220 of the vehicle 105.

The routing application 140 may also receive refueling information 235 from the charging stations 170, where the refueling information 235 includes station location, the level of station activity, price data relating to the cost of fuel, brands of fuel available, and hours of operation. This additional refueling information 235 may allow the routing application 140 to avoid routing a vehicle 105 to a charging station 170 that may be closed, or that may be too busy to refuel the vehicle 105.

Then, using at least a subset of the available information, the routing application 140 may create a route 205 accounting for refueling concerns. The routing application 140 may use the initial amount of fuel in the vehicle 105 as a starting point for the amount of fuel remaining, and may decrease the amount of fuel remaining according to the fuel efficiency 220 of the vehicle 105 and the estimated distance to travel down each path. The routing application 140 may also reset the available fuel amount for the vehicle 105 when the vehicle 105 reaches a charging station 170. Then, when determining the route 205, the routing application 140 may discard paths where the vehicle 105 runs out of fuel. This path accounting for fuel capacity of the vehicle 105 may then be used as the route 205 for the vehicle 105.

Additionally, based on the refueling information 235 for the charging stations 170 indicated, the routing application 140 may determine a fuel cost for refueling at each charging station 170 for the route 205. For example, the routing application 140 may assign weighting factors to the cost of paths according to fuel cost using a least expensive fuel heuristic, such that the cost of refueling at a higher priced charging station 170 is reflected as a higher path cost. Then, the routing application 140 may optimize the route 205 accounting for the modified path cost to create a route 205 that may not be shortest, but that may have a lower overall fuel cost.

In some instances, a partial fuel fill ups heuristic may be utilized as a further option to reduce the overall fuel cost for a route 205. For example, if an expensive charging station 170 cannot be avoided, the route 205 may be further optimized to take only a partial vehicle 105 charge from the expensive charging station 170. As another example, if the vehicle 105 may be recharged at home, then only a partial charge may be taken at a charging station 170 along the route 205 sufficient to allow the vehicle 105 to return home.

Other heuristics may also be utilized to determine routes 205 with different characteristics, and may be specified by a user as one or more user preferences 240. For example, travel times may be affected by number of stoplights, speed limit, or other factors. Thus, a fastest route heuristic may weigh path costs by estimated travel time to determine a fastest route 205. Using a fastest route heuristic, the routing application 140 may determine a route 205 including a stop at a charging station 170 at a greater distance than a closer charging station 170, due to the closer charging station 170 having a longer queue of vehicles 105 waiting to be refueled. As another example, some paths may be on gravel rather than paved roads, and such paths may be less fuel-efficient than paved paths. Thus, a most fuel-efficient route heuristic may weigh path costs by fuel efficiency of the path to determine a fastest route 205.

The routing application 140 may further take into account safety factors, and/or driver 'comfort' factors when determining the route 205. For example, some drivers may prefer to refuel more often than strictly necessary, so that the available range of the vehicle 105 does not drop below an indicated threshold (e.g., miles remaining, gallons of fuel, etc.). This driver comfort factor threshold may be specified by a user as a user preference 240, and may be used by the routing application 140 alone or in combination with the maximum fuel capacity for the vehicle 105. As another example, the system may determine a safety factor threshold (e.g., based on historical performance, known margins of error in received data elements, etc.) to ensure that determined routes 205 allow for sufficient fuel remaining while accounting for the margin of error of the system.

The routing application 140 may further take into account traffic delays when determining the route 205, such as by increasing the relative cost of paths indicating delays. For example, the routing application 140 may receive traffic information 230 from a traffic data system 155, and may use the traffic information 230 to remove or increase the cost of congested paths on the graph before running the routing algorithm. The routing application 140 may also take into account other factors when determining the route 205, such as weather conditions (rain, wind, hilly terrain) that may affect the efficiency and accordingly the range of the vehicle 105. The routing application 140 may also take into account vehicle weight and vehicle condition when determining the route 205, further factors that may reduce the potential fuel efficiency 220 of the vehicle 105.

It should be noted that in systems where the application servers 165 perform at least a portion of the processing, further refinements to the route 205 may be performed due to additional knowledge regarding the location of other vehicles 105. For example, a portion of the routing application 140 executed on the application servers 165 may determine and route around potential areas of congestion based on the estimated locations of other vehicles 105 due to their determined routes 205.

As another example, a portion of the routing application 140 executed on the application servers 165 may utilize other vehicles 105 as charging stations 170. Some vehicles 105 may be equipped with an ability to provide excess fuel to other vehicles 105, such as by way of a charge plug for electric vehicles 105. Accordingly, the application servers 165 may maintain information regarding the location of vehicles 105 so equipped, and may offer them as charging stations 170 for vehicles 105 that may otherwise become stranded. The vehicles 105 providing the charging may be compensated for their service, such as by discounts on use of the application servers 165.

In any event, once the routing application 140 has determined the route 205, taking into account all the information, the routing application 140 may send the route 205 to a display device 245 for display. In some instances, the route 205 may be displayed on a screen of the processing device 130 itself. In other instances, the route 205 may be exported into a GPS display device 245 that may display the route 205 information superimposed on a map. In still other instances, the route may be displayed as a list of destinations 210, optionally included textual descriptions of any turns or other movements necessary to follow the route 205 from one destination 210 to the next.

Figure 3:
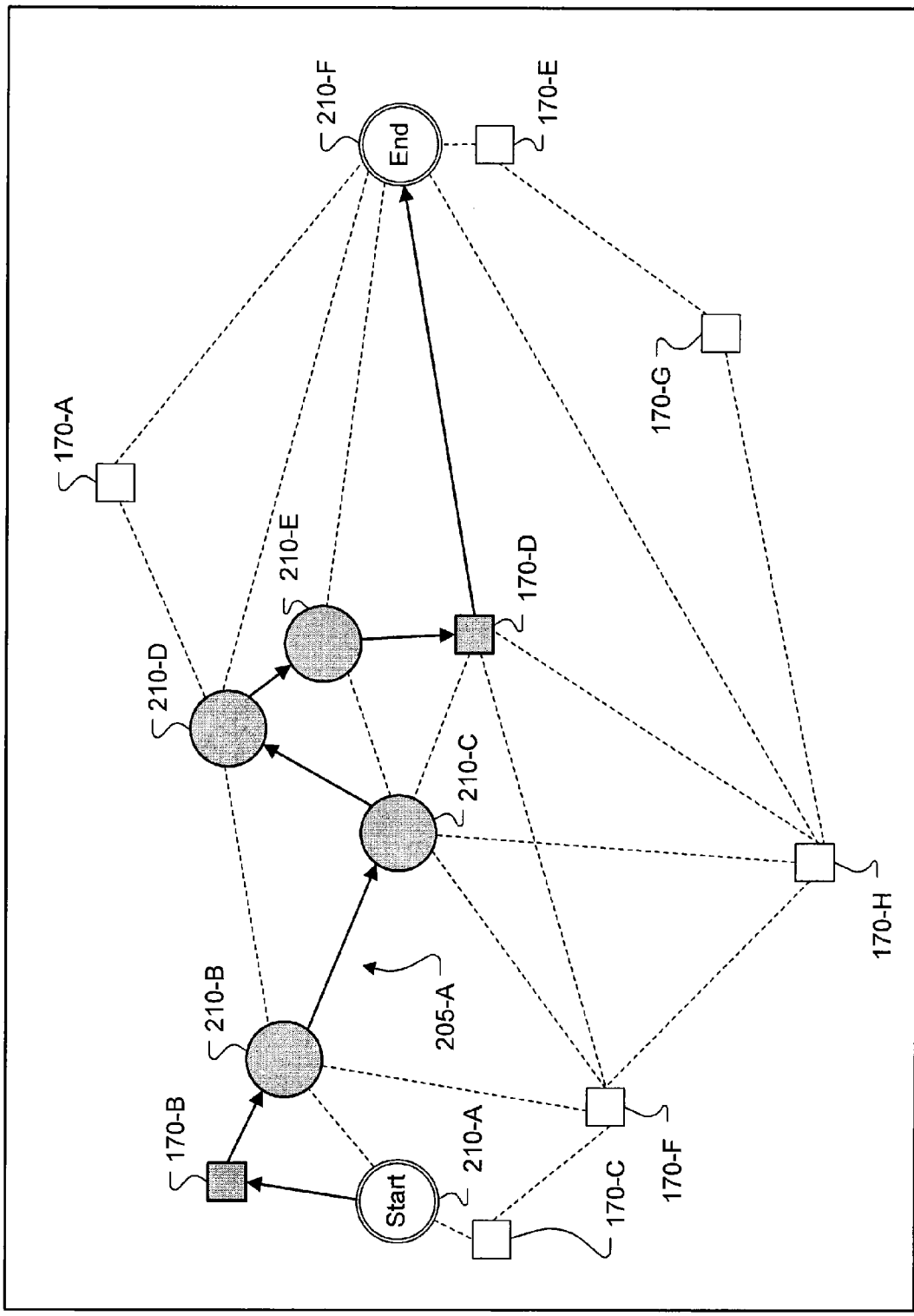
FIG. 3 illustrates an exemplary display device showing a determined route among multiple destinations and charging stations.

FIG. 3 illustrates an exemplary display device 245 showing a determined route 205-A among multiple destinations 210 and charging stations 170. The route 205-A may be determined by the processing device 130 based on the set of multiple destinations 210, and may be displayed to the user on a display device 245 such as a screen of the processing device 130 or a display portion of a GPS display device 245. As shown in the Figure, paths on the route 205-A may be indicated on the display device 245 as solid directed lines, while paths between vertices that are not on the route 205-A may be indicated as dashed lines.

More specifically, the display device 245 illustrates a plurality of charging stations 170-A through 170-H, a set of destinations 210-A through 210-F, and a set of paths between the destinations 210 and charging stations 170. The set of destinations 210-A through 210-F includes vertices corresponding to each of: the starting location referred to as destination 210-A, a first destination 210-B, a second destination 210-C, a third destination 210-D, a fourth destination 210-E, and a final destination 210-F. The illustrated route 205-A accordingly begins at the start location referred to as destination 210-A, ends at the final destination 210-F, travels through each intermediate destination 210, and stops for fuel at charging stations 170-B and 170-D to ensure the vehicle 105 retains adequate fuel.

The set of destinations 210-A through 210-F were not indicated as having any particular ordering by the user. However, in some instances, a user may specify that particular destinations 210 should be visited in a specified order. Additionally, while destinations 210-A and 210-F are at different locations, for routes 205 that are round-trips, the first and last destinations 210 may be the same location.

Figure 4:
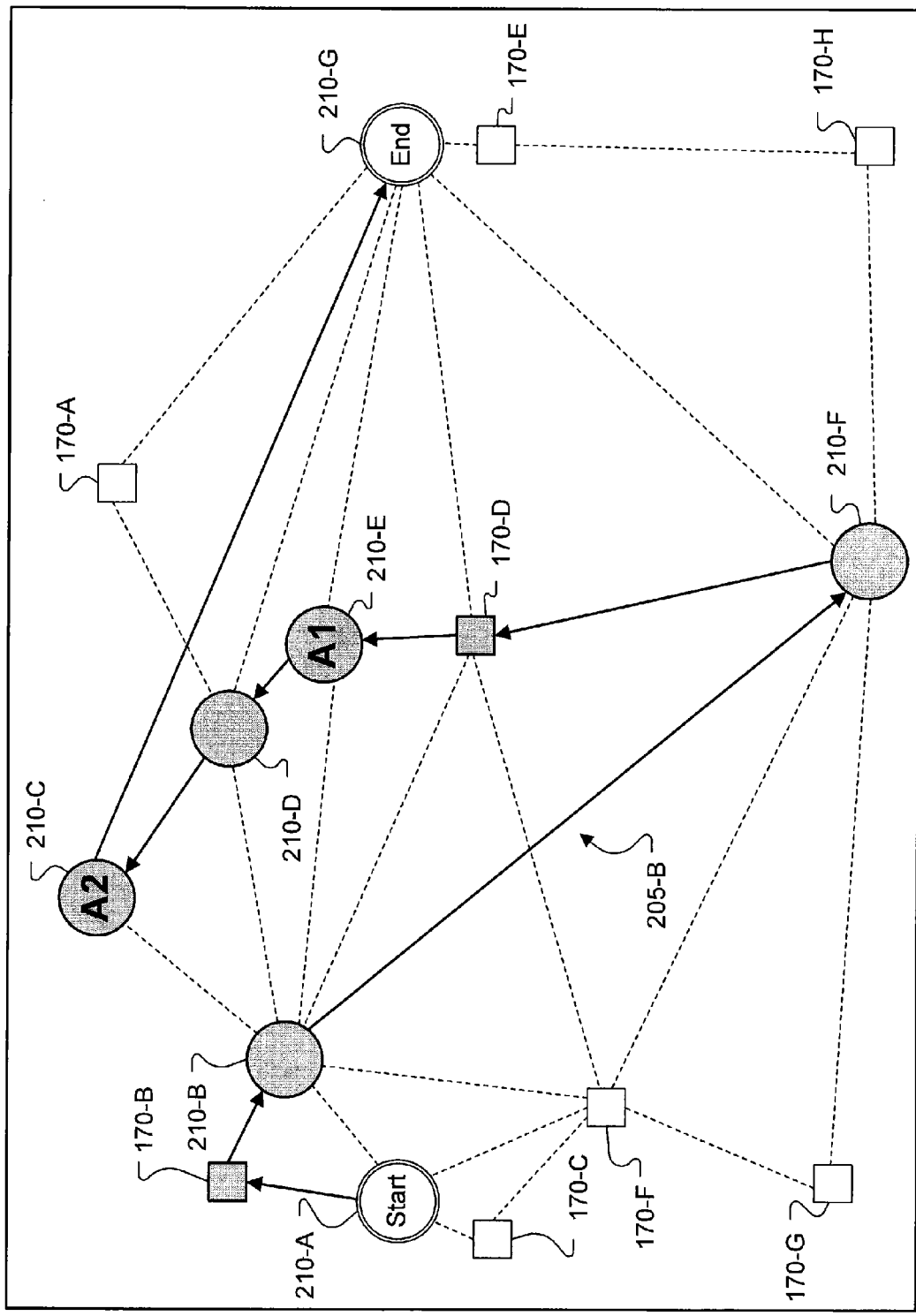
FIG. 4 illustrates an exemplary display device showing a determined route among multiple destinations and charging stations having a set of ordered points.

FIG. 4 illustrates an exemplary display device 245 showing a determined route 205-B among multiple destinations 210 and charging stations 170 having a set of ordered points. The route 205-B may be determined by the processing device 130 based on the set of multiple destinations 210, and may be displayed to the user on a display device 245 such as a screen of the processing device 130 or a display portion of a GPS display device 245. Specifically, destination 210-E (marked in the Figure as A1) is indicated in the set of destinations 210 as being required to be visited before destination 210-C (marked in the Figure as A2). This ordering imposes an additional requirement on the computation of the illustrated route 205-B. Accordingly, to satisfy this requirement, the route 205-B as shown arrives at destination 210-E before arriving at destination 210-C.

More specifically, the display device 245 illustrates a plurality of charging stations 170-A through 170-H, a set of destinations 210-A through 210-G, and a set of paths between the destinations 210 and charging stations 170. The set of destinations 210-A through 210-G includes a vertices corresponding to: initial destination 210-A, a first destination 210-B, a second destination 210-C, a third destination 210-D, a fourth destination 210-E that is to be visited before the second destination 210-C, a fifth destination 210-F, and a final destination 210-G. The illustrated route 205-B accordingly begins at the start location referred to as destination 210-A, ends at the final destination 210-F, travels through each intermediate destination 210, and stops for fuel at charging stations 170-B and 170-D to ensure the vehicle 105 retains adequate fuel.

In some instances, it may be desirable to alter the route 205-B once it has been determined. For example, a user may desire to alter the route 205-B to add, remove, or alter the set of destinations 210. As another example, the routing application 140 may receive indication of a rapid decrease in temperature in vehicle information 250 from a temperature sensor 110, where the temperature change may affect fuel efficiency 220 for the vehicle 105. As yet another example, the routing application 140 may receive a notification of accident on a path within traffic information 230 received from a traffic data system 155. In these and other examples, the routing application 140 may receive new information, and may determine an updated route 205.

Figure 5:
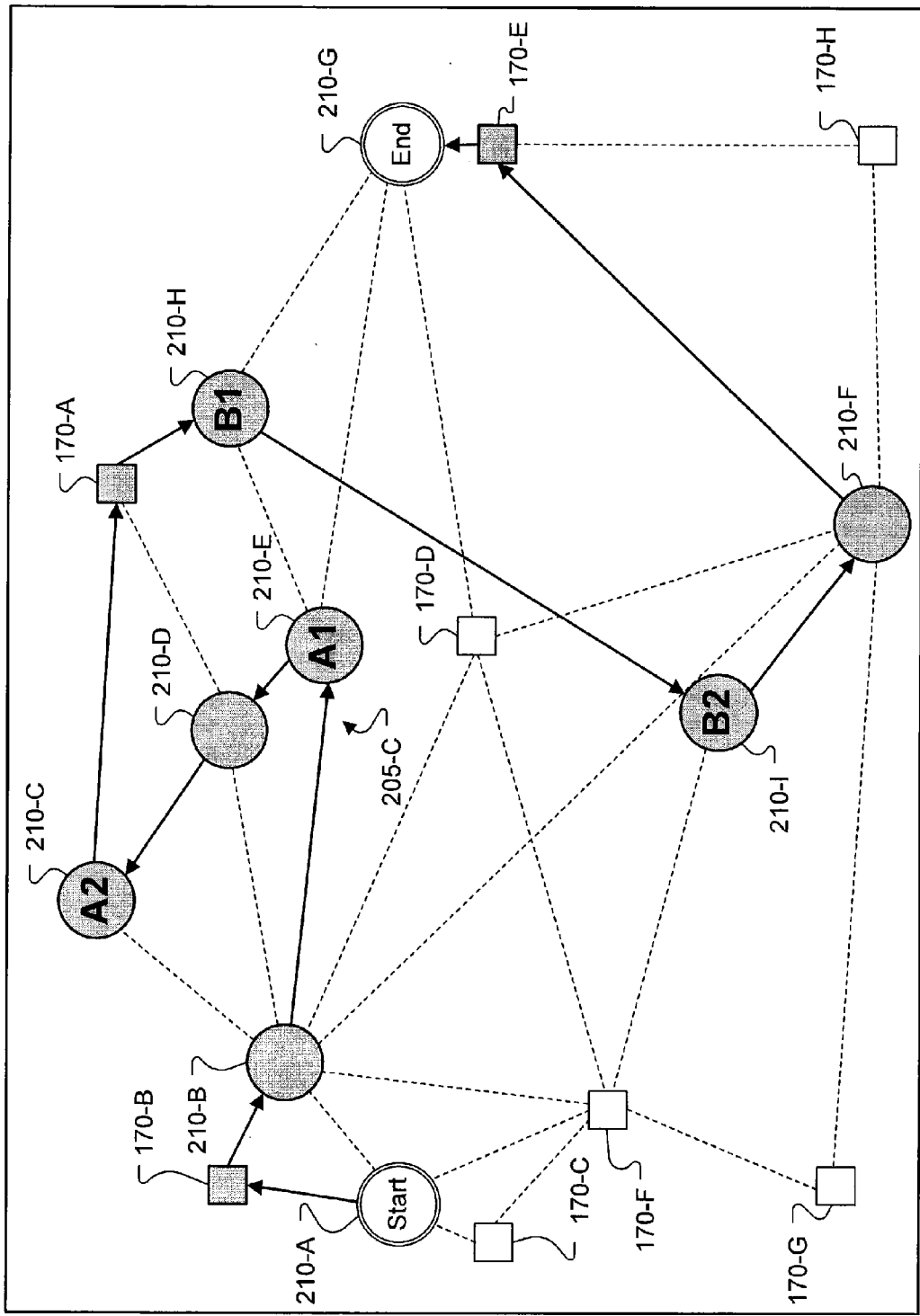
FIG. 5 illustrates an exemplary display device showing a determined route among multiple destinations and charging stations updated to have two independents sets of ordered points.

FIG. 5 illustrates an exemplary display device 245 showing a determined route 205-C among multiple destinations 210 and charging stations 170 updated to have two independent sets of ordered points. The route 205-C may be determined by the processing device 130 based on the set of multiple destinations 210, and may be displayed to the user on a display device 245 such as a screen of the processing device 130 or a display portion of a GPS display device 245. As shown in FIG. 5, destinations 210-H and 210-I have been added to the set of destinations 210 illustrated in FIG. 4. Specifically, destination 210-E (marked as A1) is indicated as being required to be visited before destination 210-C (marked as A2), while destination 210-H (marked as B1) is indicated as being required to be visited before destination 210-I (marked as B2). Accordingly, route 205-C as shown arrives at destination 210-E before arriving at destination 210-C, and also arrives at destination 210-H before arriving at destination 210-I. However, because the two sets of ordered points of destinations 210 are not related to one another, the route 205-C is free to arrive at destination 210-H after arriving at destination 210-E, but before arriving at destination 210-C.

More specifically, the display device 245 illustrates a plurality of charging stations 170-A through 170-H, a set of destinations 210-A through 210-I, and a set of paths between the destinations 210 and charging stations 170. The set of destinations 210-A through 210-I includes a vertex corresponding to the starting location 210-A, a first destination 210-B, a second destination 210-C, a third destination 210-D, a fourth destination 210-E that is to be visited before the second destination 210-C, a fifth destination 210-F, a sixth destination 210-H, a seventh destination 210-I that is to be visited after the sixth destination 210-H, and a final destination 210-G. The illustrated route 205-C accordingly begins at the start location referred to as destination 210-A, ends at the final destination 210-F, travels through each intermediate destination 210, and stops for fuel at charging stations 170-A, 170-B, and 170-E to ensure the vehicle 105 retains adequate fuel.

It should be noted that while the route 205-C illustrated in FIG. 5 arrives at many of the same destinations 210 as in FIG. 4, the route 205-C shown in FIG. 5 differs somewhat from the route 205-B shown in FIG. 4. For example, route 205-B heads to destination 210-F early on in the route 205-B, and then heads to charging station 170-D. By comparison, route 205-C heads to destination 210-F late in the route 205-C and heads to charging stations 170-A and 170-E instead of charging station 170-D.

These differences between routes 205-B and 205-C are required in part because of the limited range of the vehicle 105. Because of this limited range, additional travel of even a small distance may cause the vehicle 105 to exceed its range, and therefore require substantial changes to the route 205 to accommodate additional refueling stops earlier in the route 205. Accordingly, the routing application 140 may address these complicated routing decisions, and may provide an route 205 to the user that accommodates the capabilities of the vehicle 105 while at the same time meeting the specific requirements of the user.

Figure 6:
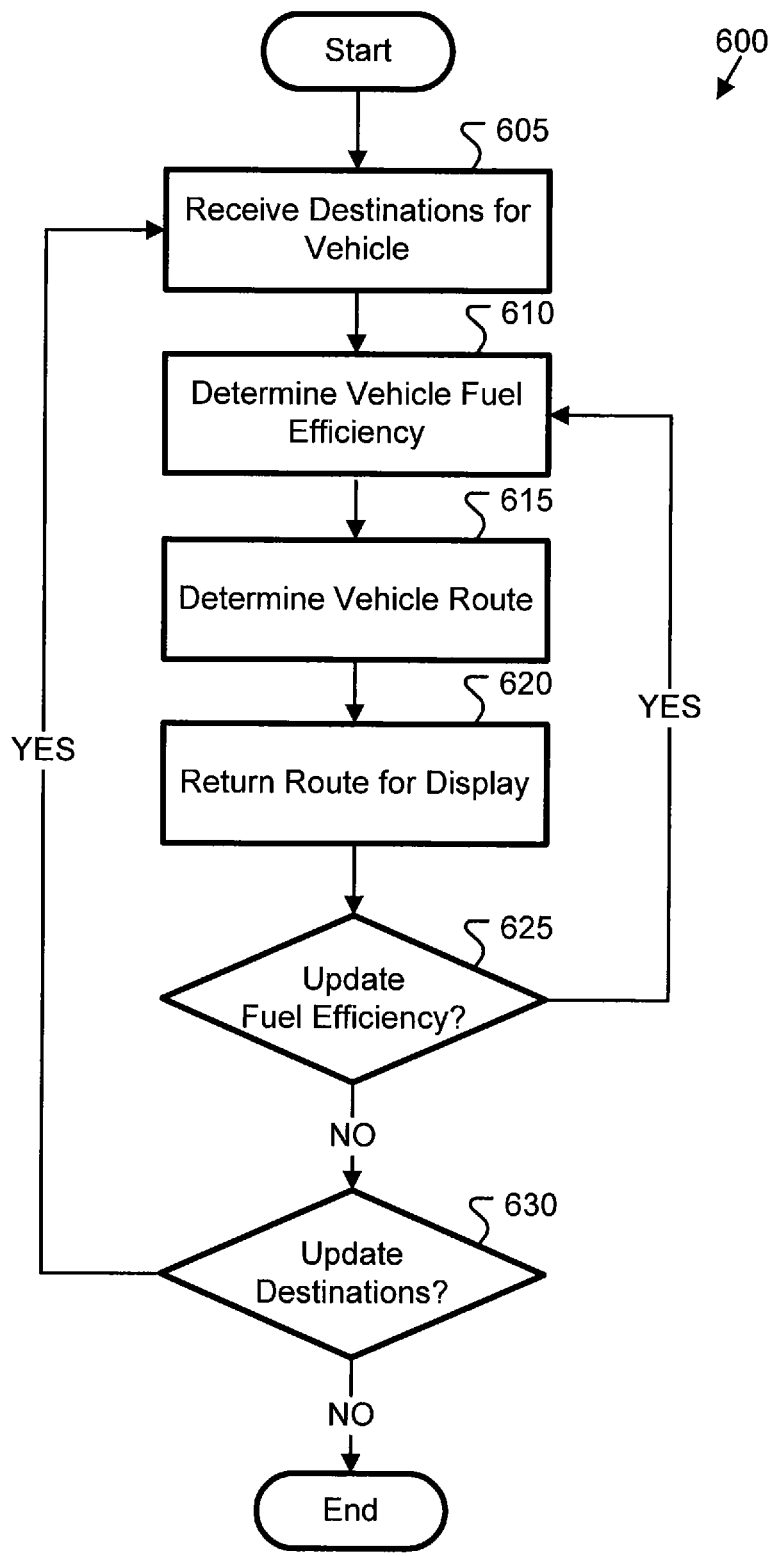
FIG. 6 illustrates an exemplary process flow for determining a route including a recharge plan.

FIG. 6 illustrates an exemplary process flow 600 for determining a route 205 including a recharge plan. The process 600 may be performed by various systems, such as the system 100 described above with respect to FIG. 1.

In block 605, the system receives a set of destinations 210 for a vehicle 105. For example, a user may enter the set of destinations 210 into a processing device 130, such as a mobile phone or an in-vehicle 105 computer.

In block 610, the system determines a fuel efficiency of the vehicle 105. For instance, a routing application 140 included on the processing device 130 may determine the fuel efficiency 220 of the vehicle 105 for which a route 205 is to be generated. In other instances, the routing application 140 included on the processing device 130 may send a request to an application server 165 with a message including information required to allow for the application server 165 to determine the fuel efficiency 220.

Regardless of approach, the fuel efficiency 220 may be determined according to vehicle specification data 145 indicating the overall fuel efficiency of the vehicle 105. The fuel efficiency 220 may also be determined according to average actual vehicle 105 efficiency obtained from historical vehicle 105 statistics included in vehicle information 250 received by the routing application 140 from the vehicle 105. The fuel efficiency 220 may further be modified according to additional factors, such as weather information 225, and estimated speed of travel, among others. For example, colder weather or additional accessory draw may reduce the overall fuel efficiency 220 of the vehicle 105.

In block 615, the system determines a route 205 for the vehicle 105 to travel. For example, the routing application 140 or application server 165 may employ an algorithm such as Dijkstra's algorithm or the A* algorithm to find a route 205 from the present location to each of the received destinations 210 for the vehicle 105. In instances where, the application servers 165 perform the processing, the application servers 165 may send a reply to the processing device 130 including the determined route 205 and/or fuel efficiency 220.

In block 620, the system returns the route 205 for display on a display device 245. In some instances, the route 205 may be displayed on a screen of the processing device 130. In other instances, the route 205 may be exported into a GPS device that may display the route 205 information superimposed on a map. In still other instances, the route may be displayed as a list of destinations 210, optionally including textual descriptions of any turns or other movements necessary to follow the route 205 from one destination 210 to the next.

In decision point 625, the system determines whether fuel efficiency 220 of the vehicle 105 requires updating based on changes in factors affecting the fuel efficiency 220. For example, a temperature sensor 110 or a weight sensor 120 may indicate to the routing application 140 that a change in weather or vehicle 105 weight may require a recalculation of the fuel efficiency 220. If the fuel efficiency 220 is updated, then the route 205 may also require updating. Accordingly, if it is determined that the fuel efficiency 220 of the vehicle 105 requires updating, block 610 is executed next. Otherwise decision point 630 is executed next.

In decision point 630, the system determines whether the set of destinations 210 should be updated. For example, the user of the processing device 130 may request to enter an additional destination 210 to be included in the route 205, remove a destination 210 from the route 205, change the location of a destination 210 on the route 205, or modify a dependency of one destination 210 on another. If the set of destinations 210 should be updated, block 605 is executed next. Otherwise, the process 600 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a processing device; and
a routing application included on the processing device and configured to:
receive a destination location for a vehicle;
determine a fuel efficiency of the vehicle; and
determine a route for the vehicle from a current location to the destination location, the route being based on the fuel efficiency of the vehicle, a fuel capacity of the vehicle, an amount of fuel remaining for the vehicle, and navigation information including locations of a plurality of charging stations,
wherein the routing application is configured to determine whether to add at least one of the plurality of charging stations as an additional destination along the route to ensure that the vehicle retains adequate fuel to complete the route.

2. The system of claim 1, wherein the routing application is further configured to determine the route according to at least one of Dijkstra's algorithm and the A* algorithm.

3. The system of claim 1, wherein the processing device is at least one of a mobile telephone, a global positioning system device, and a computing device embedded within the vehicle.

4. The system of claim 1, wherein the routing application is further configured to determine the fuel efficiency based on at least one of:
i. vehicle specification data including fuel efficiency data for a model of vehicle;
ii. average actual vehicle efficiency obtained from historical vehicle statistics;
iii. weather information; and
iv. estimated speed of travel.

5. The system of claim 1, wherein the routing application is further configured to:

receive an indication of a change in at least one factor that affects fuel efficiency of the vehicle;

update the fuel efficiency of the vehicle based on the indication; and determine whether to add, while the vehicle is navigating the route, at least one of the plurality of charging stations to the route based on the updated fuel efficiency.

6. The system of claim 1, further comprising:

a communications network in selective communications with the processing device; and a navigation data system in communication with the processing device over the communications network;

wherein the processing device is further configured to receive at least a portion of the navigation information from the navigation data system.

7. The system of claim 6, further comprising a weather data system in communication with the processing device over the communications network and configured to send weather information to the routing application;

wherein the routing application is further configured to determine the fuel efficiency for the vehicle accounting for weather conditions indicated by the received weather information.

8. The system of claim 6, further comprising a traffic data system in communication with the processing device over the communications network and configured to send traffic information to the routing application;

wherein the routing application is further configured to determine the route for the vehicle according to the received traffic information.

9. The system of claim 1, further comprising at least one sensor associated with the vehicle, wherein the processing device is in selective communication with the at least one sensor.

10. The system of claim 9, wherein the at least one sensor includes a position sensor configured to determine a location of the vehicle, and where the routing application is configured to determine the current location of the vehicle according to the position sensor.

11. The system of claim 9, wherein the at least one sensor includes a charge level sensor configured to determine the amount of fuel remaining for the vehicle, and where the routing application is configured to receive the determined amount of fuel remaining for the vehicle from the charge level sensor.

12. The system of claim 9, wherein the at least one sensor includes at least one of a temperature sensor configured to determine a temperature of the vehicle and a weight sensor configured to determine a weight of the vehicle, and where the routing application is configured to:

receive an indication of a change in at least one of temperature and vehicle weight;

update the fuel efficiency of the vehicle based on the indication; and determine whether to add, while the vehicle is navigating the route, at least one of the plurality of charging stations to the route based on the updated fuel efficiency.

13. The system of claim 1, further comprising an application server, wherein the routing application is configured to determine the route in part by sending a message to the application server including the destination location, and receiving the determined route from the application server.

14. The system of claim 1, wherein the processing device is further configured to:

receive a second destination location for the vehicle; and
determine the route for the vehicle further including the second destination location.

15. The system of claim 14, wherein the processing device is further configured to:

receive an indicated ordering of the destination location and the second destination location; and determine the route according to the indicated ordering.

16. The system of claim 14, wherein the processing device is configured to determine an order of the destination location and the second destination location along the route based at least in part on a range of the vehicle and a user preference.

17. The system of claim 1, wherein the routing application is configured to add at least one of the charging stations to the route prior to the vehicle embarking on the route.

18. A method, comprising:

receiving a destination location for a vehicle;

determining by a processing device a fuel efficiency of the vehicle; and determining by the processing device a route for the vehicle from a current location to the destination location, the route being based on the fuel efficiency of the vehicle, a fuel capacity of the vehicle, an amount of fuel remaining for the vehicle, and navigation information including locations of a plurality of charging stations, the determination of the route by the processing device including determining whether to add at least one of the plurality of charging stations as an additional destination along the route to ensure that the vehicle retains adequate fuel to complete the route.

19. The method of claim 18, further comprising displaying the route as at least one of superimposed on a map, a list of destinations including charging stations, and as textual descriptions of movements necessary to follow the route.

20. The method of claim 18, further comprising determining the route further based on additional factors that affect the fuel efficiency of the vehicle, including at least one of real-time traffic conditions, weather conditions, terrain conditions, vehicle condition, and vehicle weight.

21. The method of claim 18, further comprising determining the fuel capacity of the vehicle accounting for a threshold amount that offsets the maximum fuel capacity.

22. The method of claim 21, wherein the threshold amount that offsets the maximum fuel capacity includes a user-defined comfort factor configured to ensure an additional amount of fuel is held in reserve.

23. The method of claim 18, further comprising optimizing the route according to at least one of a shortest path heuristic, a fastest route heuristic, a most fuel-efficient route heuristic, a least expensive fuel when refueling heuristic, and a partial fuel fill-up heuristic.

24. The method of claim 18, further comprising:

receiving reports of the present status of at least one charging station; and determining the route further based on the received reports.

25. The method of claim 18, wherein the plurality of charging stations includes fixed charging stations and vehicles configured to provide excess fuel to other vehicles.

26. A computer-readable medium tangibly embodying computer-executable instructions configured to cause a processing device to execute operations comprising:

receiving a destination location for a vehicle;

determining a fuel efficiency of the vehicle; and determining a route for the vehicle from a current location to the destination location, the route being based on the fuel efficiency of the vehicle, a fuel capacity of the vehicle, an amount of fuel remaining for the vehicle, and navigation information locations of a plurality of charging stations, the determination of the route by the processing device including determining whether to add at least one of the plurality of charging stations as an additional destination along the route to ensure that the vehicle retains adequate fuel to complete the route.

27. The computer-readable medium of claim 26, further including instructions configured to cause a processing device to execute operations comprising:
   receiving an indication of a change in at least one of temperature and weight;
   updating the fuel efficiency of the vehicle based on the indication; and
   determining whether to add, while the vehicle is navigating the route, at least one of the plurality of charging stations to the route based on the updated fuel efficiency.

28. The computer-readable medium of claim 26, further including instructions configured to cause a processing device to execute operations comprising:
   receiving reports of the present status of at least one charging station;
   determining at least a subset of charging stations from the at least one charging station capable of refueling the vehicle; and
   determining the route further based on the subset of charging stations capable of refueling the vehicle.

* * * * *